(12) United States Patent
Sun et al.

(10) Patent No.: US 10,629,903 B2
(45) Date of Patent: Apr. 21, 2020

(54) METHOD FOR PREPARING TRANSITION METAL COMPOSITE OXIDE, TRANSITION METAL COMPOSITE OXIDE PREPARED THEREBY, AND LITHIUM COMPOSITE OXIDE PREPARED USING SAME

(71) Applicant: IUCF-HYU (INDUSTRY-UNIVERSITY COOPERATION FOUNDATION HANYANG UNIVERSITY), Seoul (KR)

(72) Inventors: Yang-Kook Sun, Seoul (KR); Sung-June Youn, Busan (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 264 days.

(21) Appl. No.: 14/909,035

(22) PCT Filed: Jul. 31, 2014

(86) PCT No.: PCT/KR2014/007082
§ 371 (c)(1),
(2) Date: Jan. 29, 2016

(87) PCT Pub. No.: WO2015/016648
PCT Pub. Date: Feb. 5, 2015

(65) Prior Publication Data
US 2016/0190579 A1 Jun. 30, 2016

(30) Foreign Application Priority Data

Jul. 31, 2013 (KR) .................. 10-2013-0091245
Jul. 31, 2014 (KR) .................. 10-2014-0098660

(51) Int. Cl.
*H01M 4/00* (2006.01)
*H01M 4/505* (2010.01)
*H01M 4/525* (2010.01)
*C01G 53/00* (2006.01)
*C01G 1/02* (2006.01)
*H01M 10/0525* (2010.01)

(52) U.S. Cl.
CPC .............. *H01M 4/505* (2013.01); *C01G 1/02* (2013.01); *C01G 53/006* (2013.01); *C01G 53/50* (2013.01); *H01M 4/525* (2013.01); *C01P 2004/03* (2013.01); *C01P 2004/53* (2013.01); *C01P 2004/61* (2013.01); *C01P 2004/62* (2013.01); *C01P 2006/11* (2013.01); *H01M 10/0525* (2013.01)

(58) Field of Classification Search
CPC .... H01M 4/505; H01M 4/525; H01M 10/052; C01G 53/006; C01G 51/50; C01G 51/006; C01G 45/006
USPC ............. 423/50, 140–145, 594.3, 594.5, 599
See application file for complete search history.

(56) References Cited

U.S. PATENT DOCUMENTS

| | | | | |
|---|---|---|---|---|
| 6,129,902 A * | 10/2000 | Sakamoto | ............... | H01M 4/52 423/594.4 |
| 2011/0171529 A1* | 7/2011 | Kono | .................. | H01M 4/0471 429/223 |
| 2011/0262796 A1* | 10/2011 | Shimooka | ........... | H01M 2/1653 429/144 |
| 2012/0064410 A1* | 3/2012 | Kim | .................... | C01G 45/1228 429/223 |
| 2012/0282524 A1* | 11/2012 | Kono | .................... | H01M 4/525 429/223 |
| 2012/0282525 A1* | 11/2012 | Nagai | .................... | H01M 4/505 429/223 |
| 2012/0321948 A1* | 12/2012 | Oya | .................... | H01M 4/0404 429/211 |
| 2013/0045421 A1* | 2/2013 | Kobino | ................ | C01G 45/006 429/223 |
| 2013/0230770 A1* | 9/2013 | Oya | ....................... | H01M 4/485 429/199 |
| 2013/0299735 A1* | 11/2013 | Chung | ................ | H01M 4/0497 252/182.1 |

FOREIGN PATENT DOCUMENTS

CN 102110808 A 6/2011

OTHER PUBLICATIONS

A novel concentration-gradient Li[Ni0.83Co0.07Mn0.10]O2 cathode material forhigh-energy lithium-ion batteries, Yang-Kook Sun et al., J. Mater. Chem., 2011, 21, 10108-10112.
Effect of Mn Content in Surface on the Electrochemical Properties of Core-Shell Structured Cathode Materials, Yang-Kook Sun et al., Journal of the Electrochemical Society, 159 (1) A1-A5 (2012).

* cited by examiner

*Primary Examiner* — Steven J Bos
(74) *Attorney, Agent, or Firm* — Sughrue Mion, PLLC

(57) ABSTRACT

The present invention relates to a method for preparing a lithium composite oxide and a lithium composite oxide prepared thereby and, more specifically, to: a method for preparing a lithium composite oxide, capable of preparing a lithium-ion secondary battery with high capacity by adjusting the amount of a basic solution added according to the nickel content during the preparation of a lithium composite oxide through a co-precipitation reaction, thereby adjusting the pH of the reactor, and thus improving the particle density and increasing the tap density, and a lithium composite oxide prepared thereby.

8 Claims, 28 Drawing Sheets

[FIG. 1]
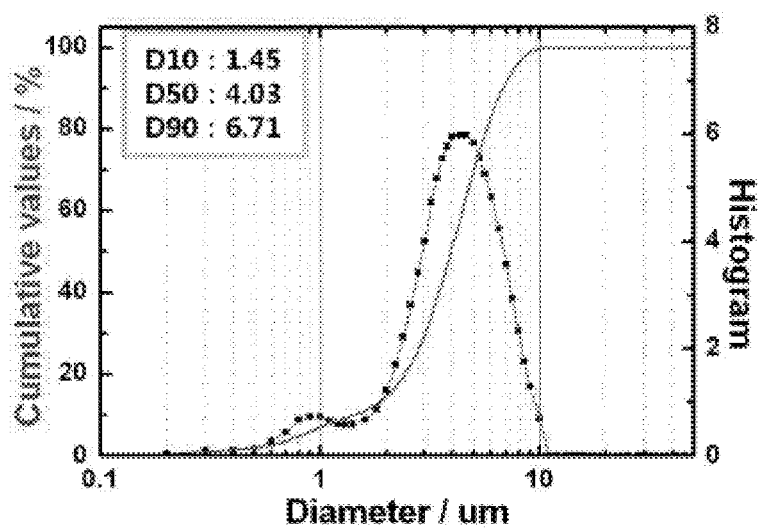

[FIG. 2]
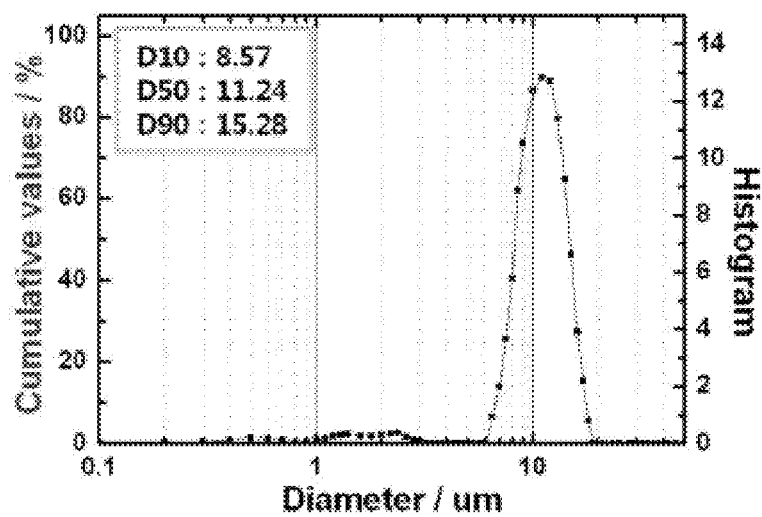

[FIG. 3]
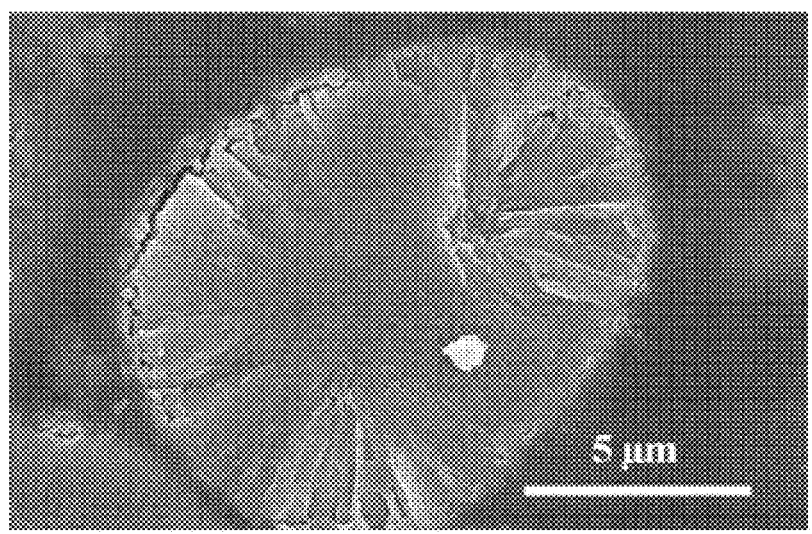

[FIG. 4]
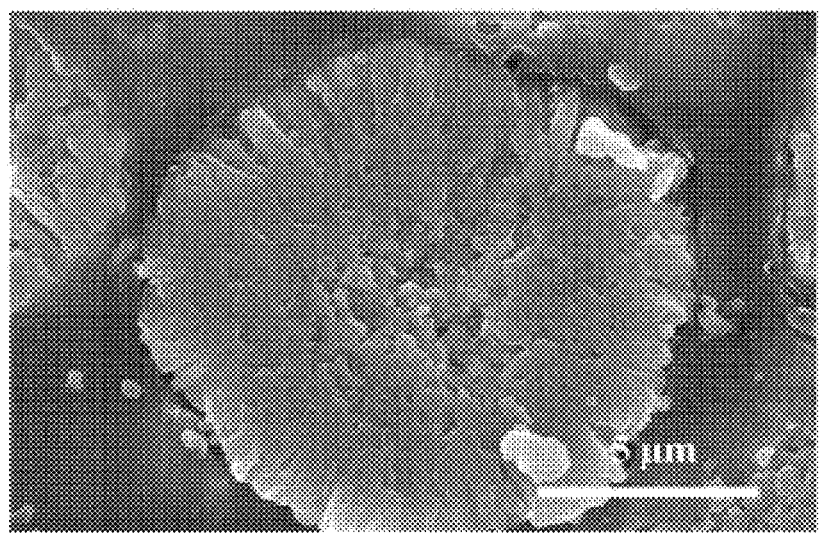

[FIG. 5]
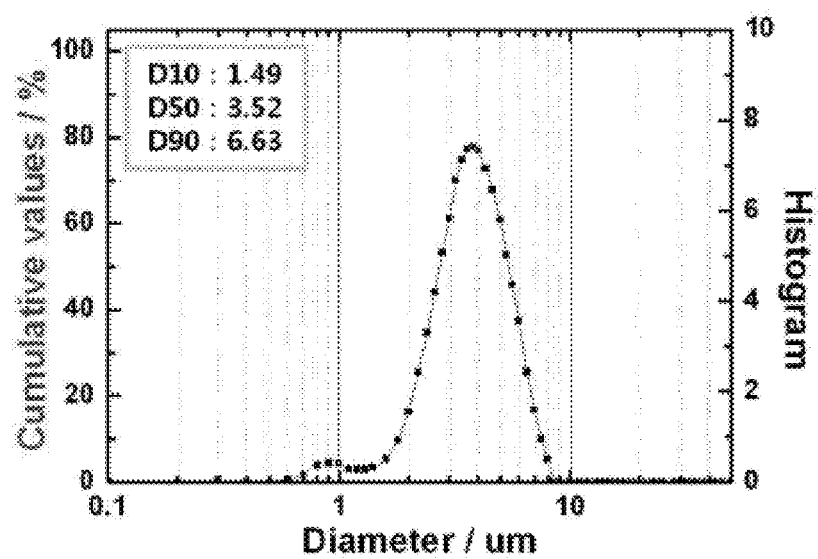

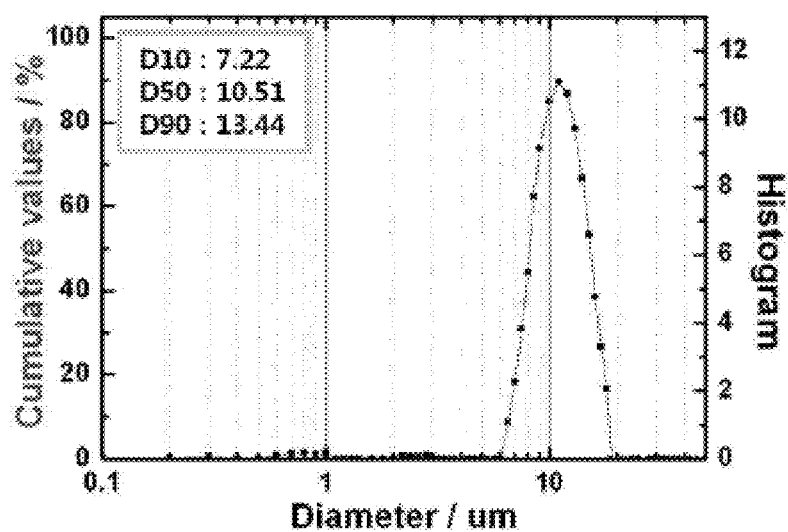
[FIG. 6]

[FIG. 7]
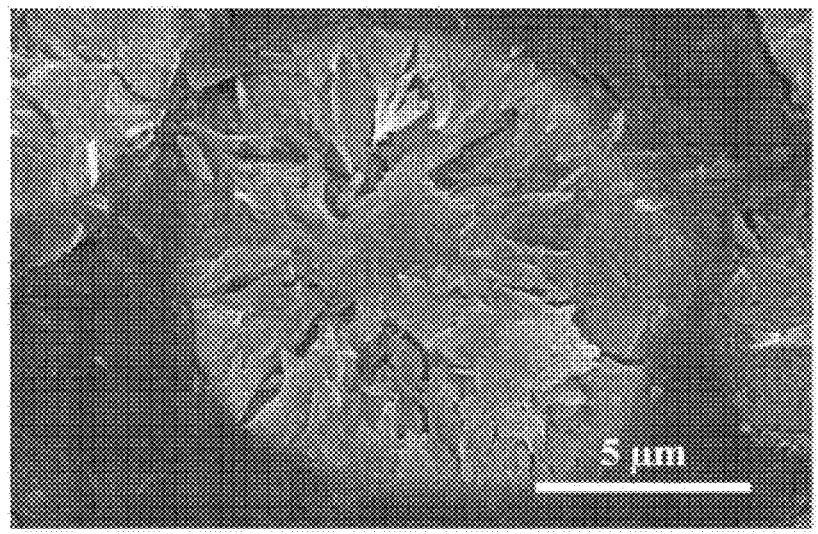

[FIG. 8]
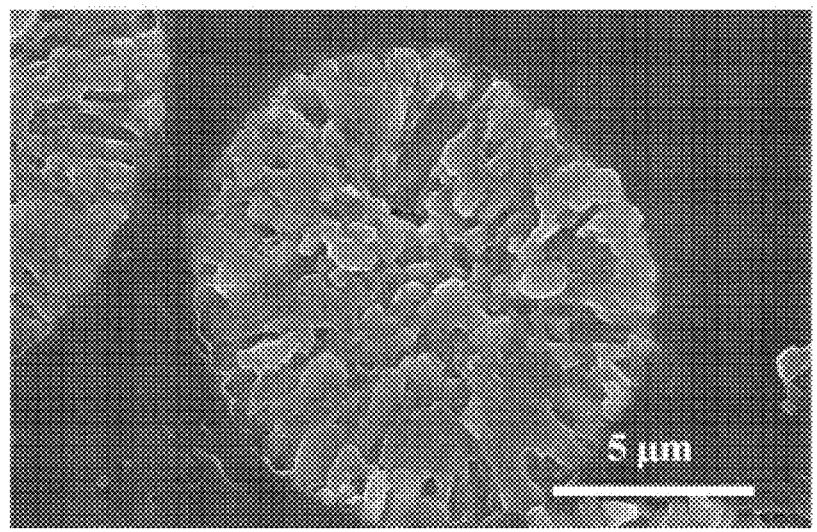

[FIG. 9]
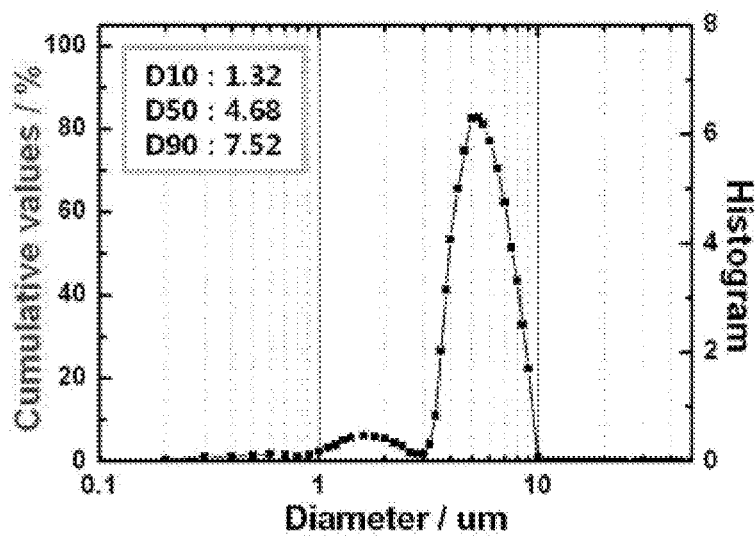

[FIG. 10]
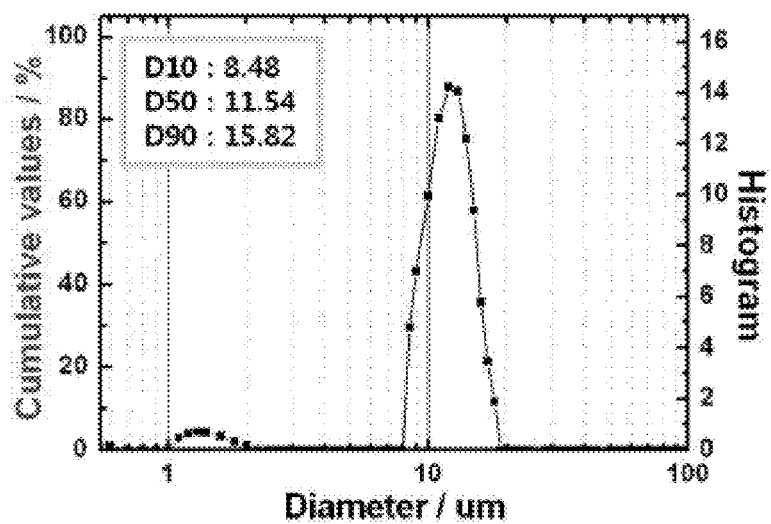

[FIG. 11]
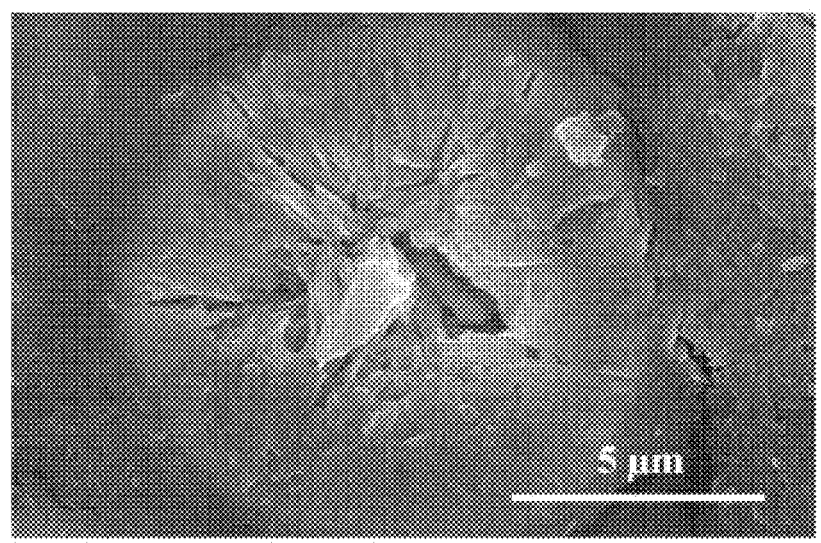

[FIG. 12]
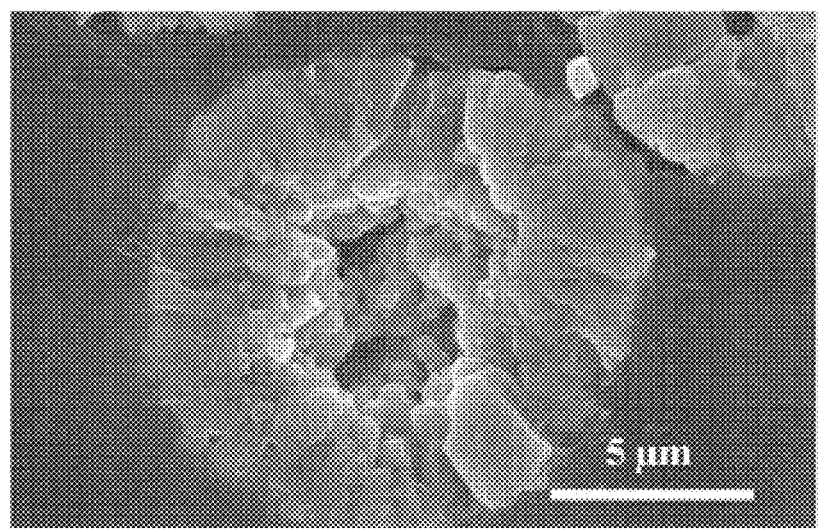

[FIG. 13]
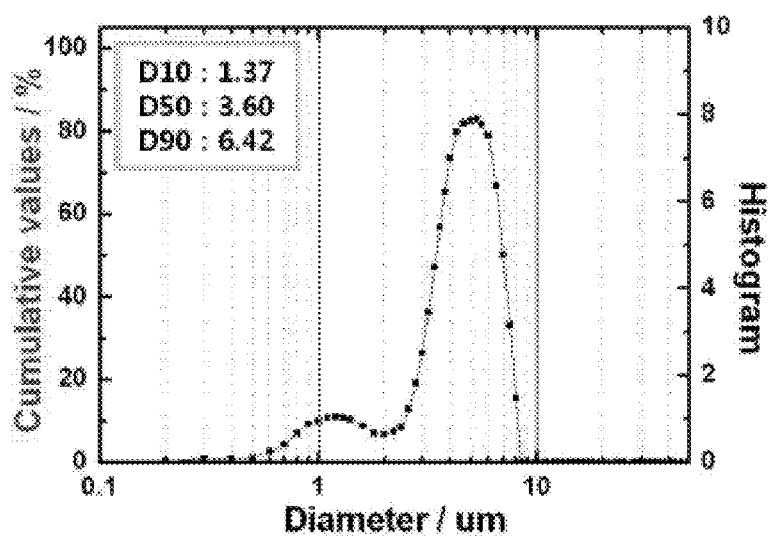

[FIG. 14]
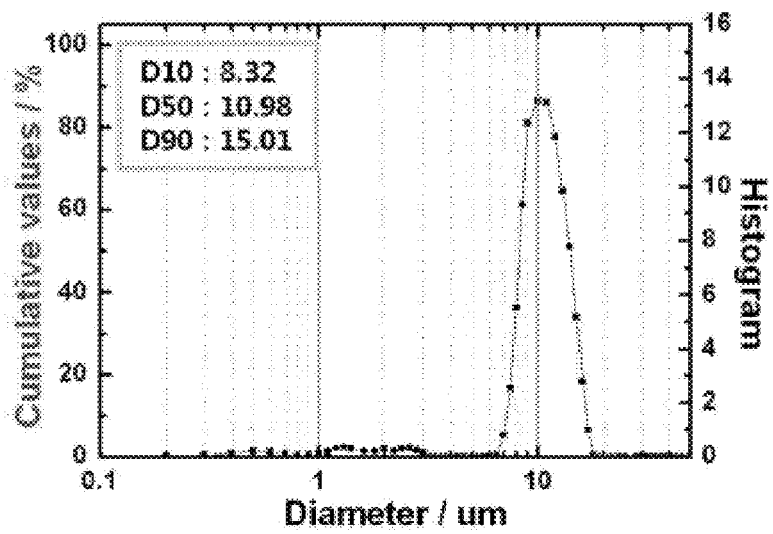

[FIG. 15]
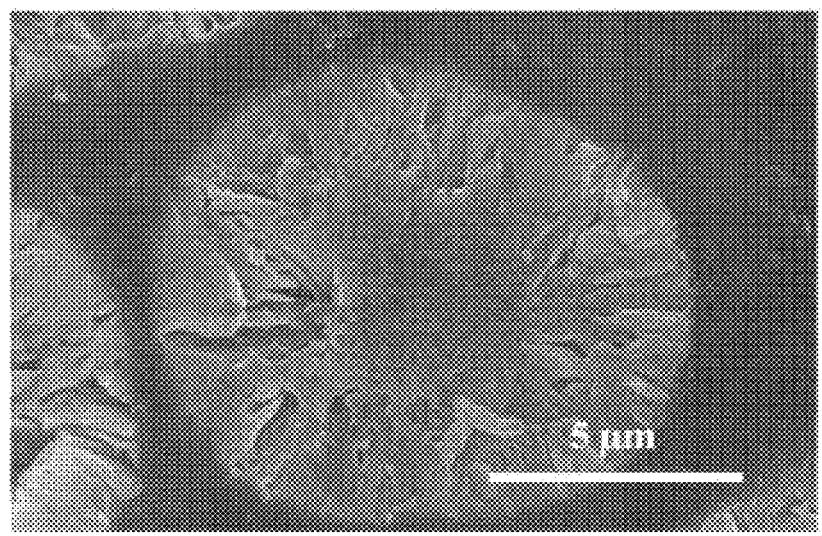

[FIG. 16]
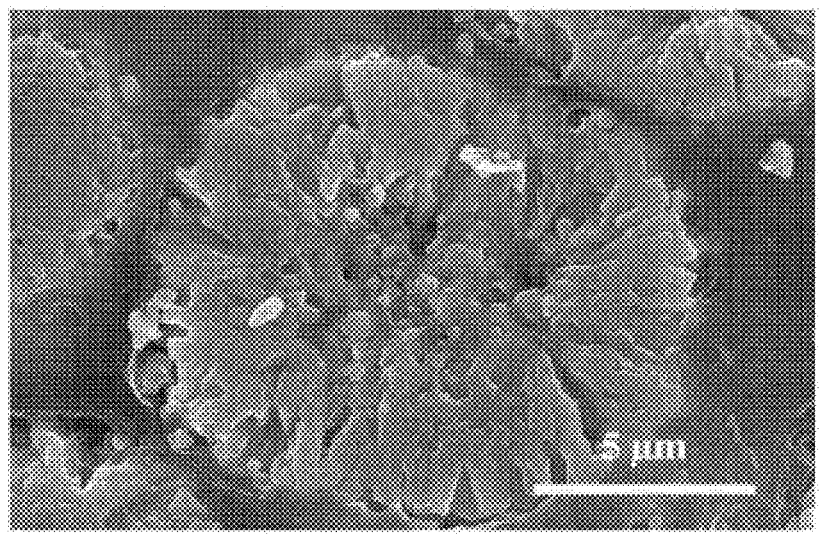

[FIG. 17]
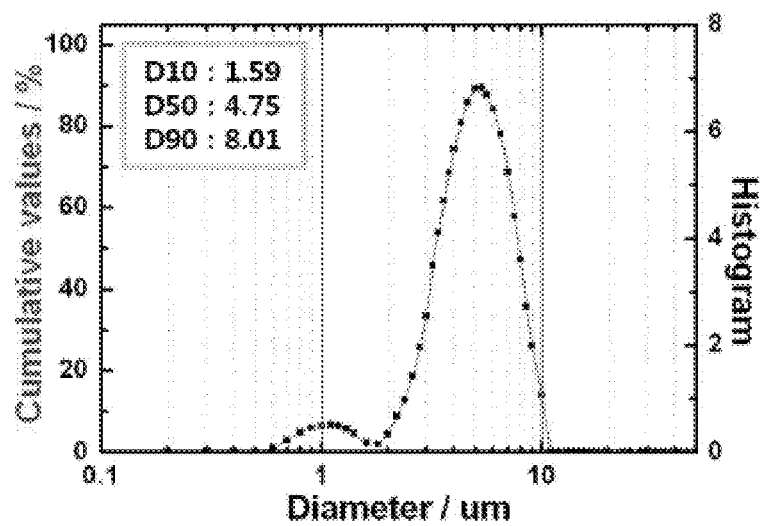

[FIG. 18]
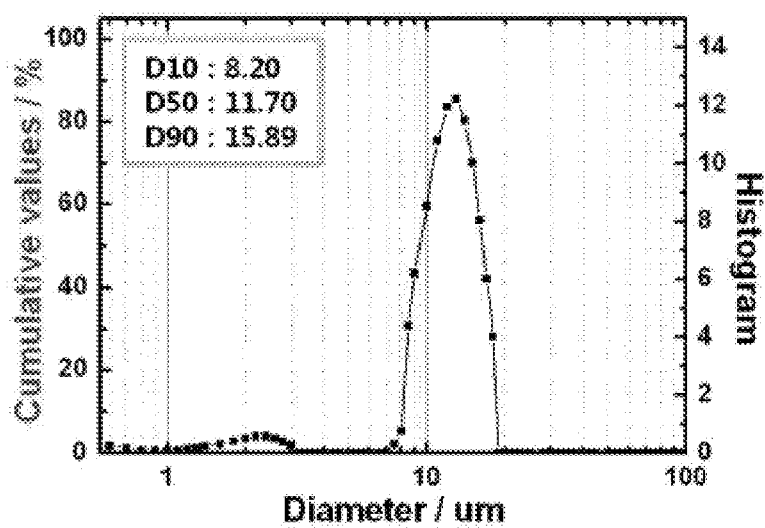

[FIG. 19]
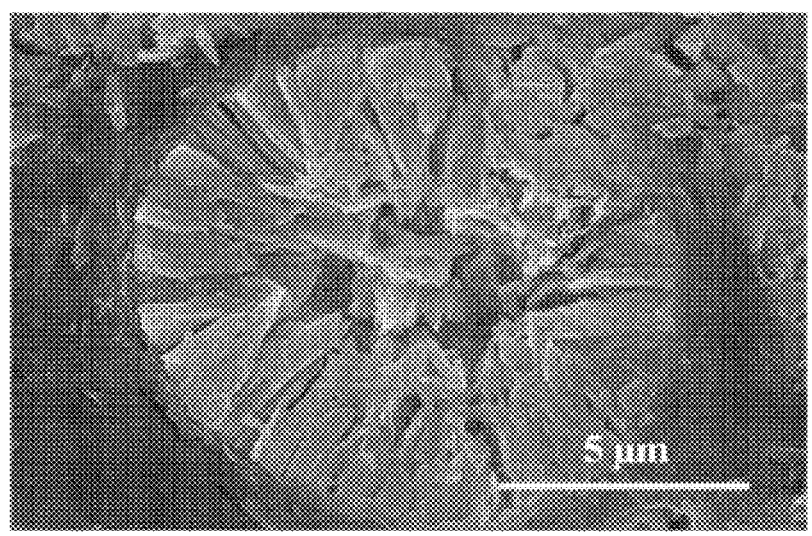

[FIG. 20]
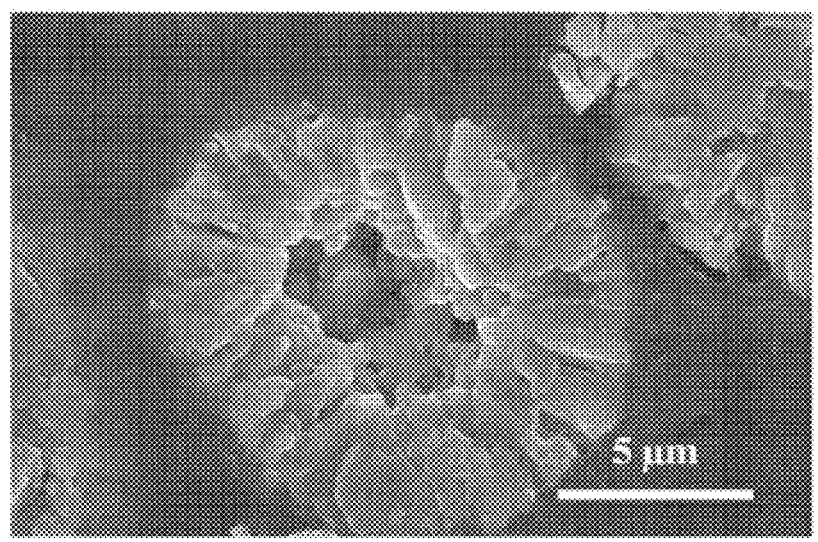

[FIG. 21]
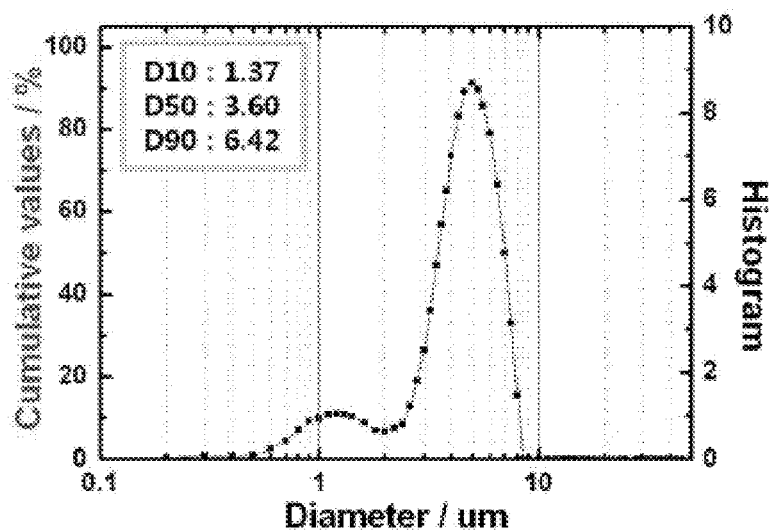

[FIG. 22]
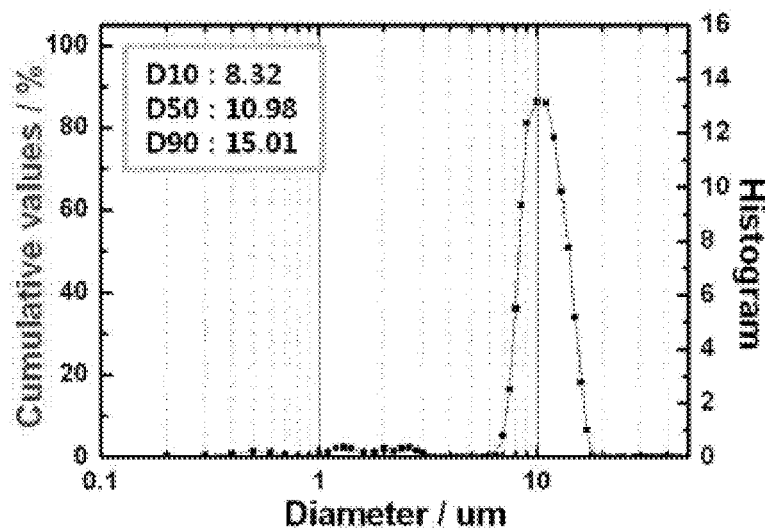

[FIG. 23]
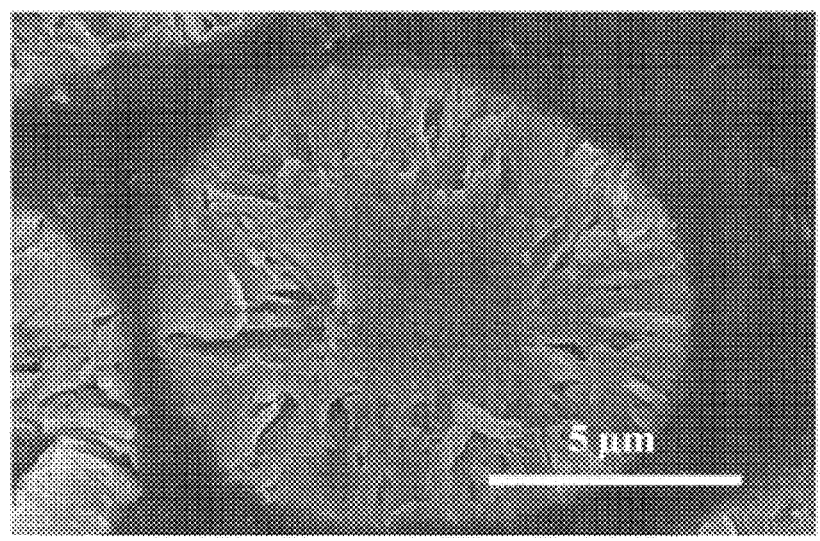

[FIG. 24]
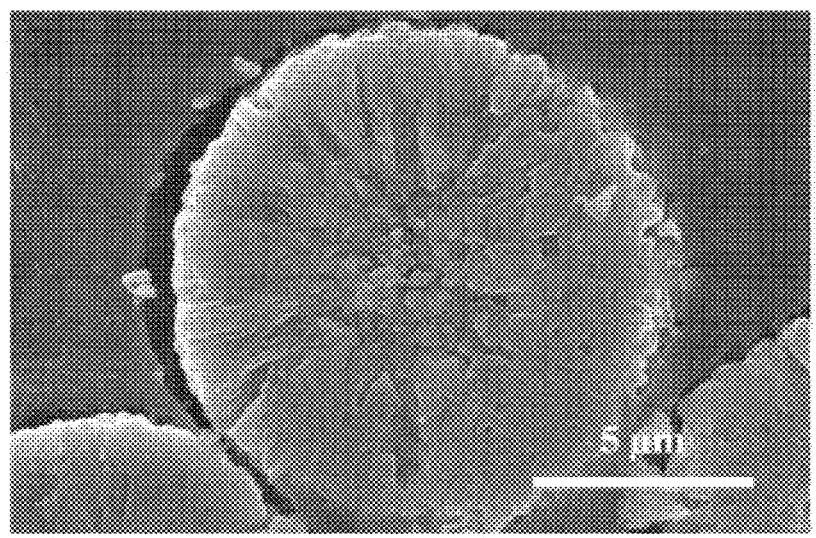

[FIG. 25]
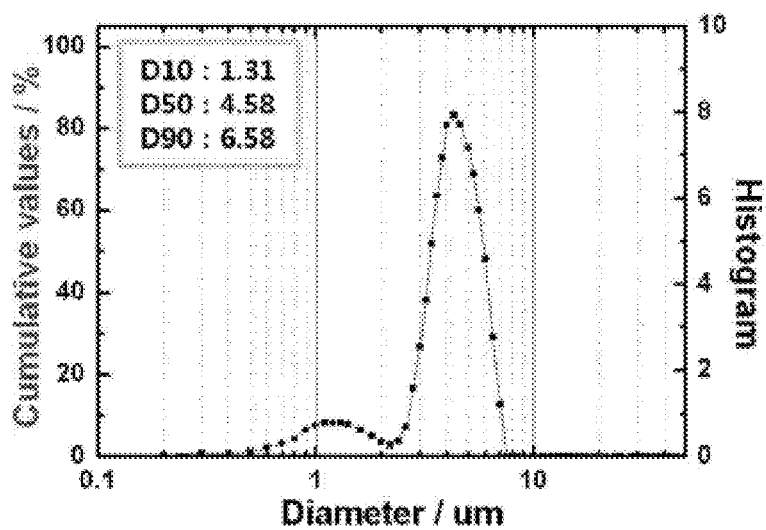

[FIG. 26]
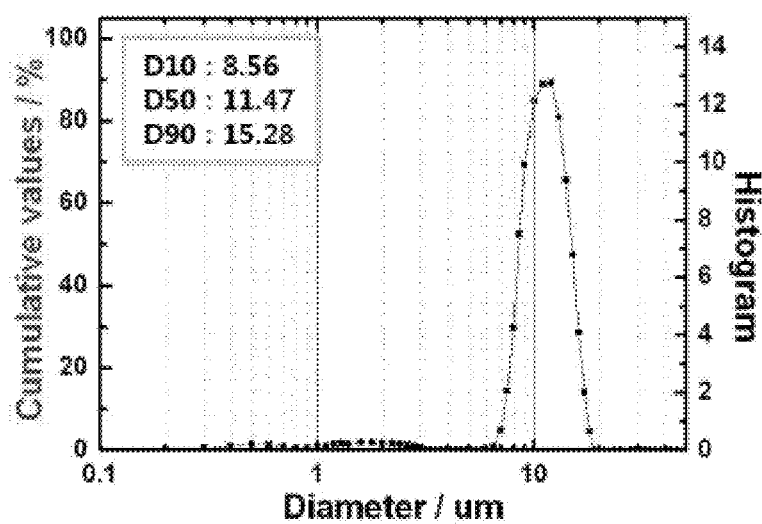

[FIG. 27]
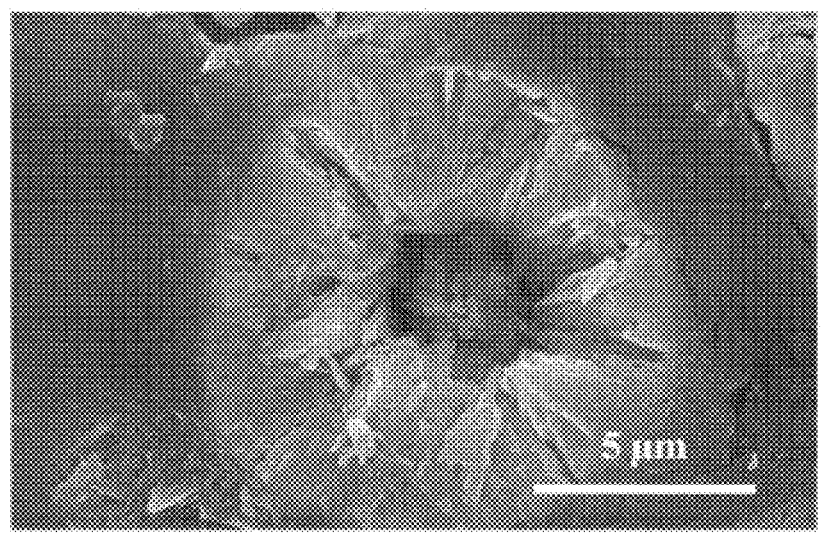

[FIG. 28]
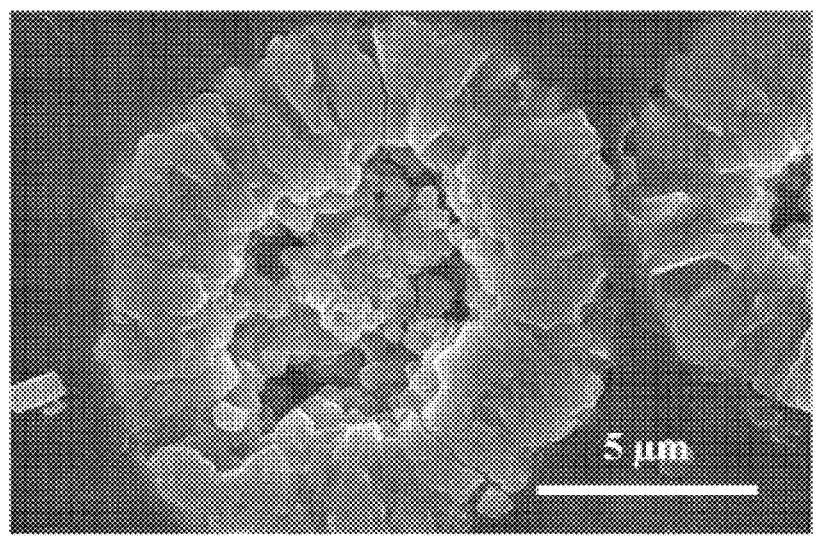

METHOD FOR PREPARING TRANSITION METAL COMPOSITE OXIDE, TRANSITION METAL COMPOSITE OXIDE PREPARED THEREBY, AND LITHIUM COMPOSITE OXIDE PREPARED USING SAME

CROSS-REFERENCE TO RELATED APPLICATIONS

This application is a 371 of PCT/KR2014/007082, filed Jul. 31, 2014, which claims the priority from Korean Patent Application Nos., 10-2014-0098660 filed Jul. 31, 2014, and 10-2013-0091245, filed Jul. 31, 2013, the contents of each of which are incorporated herein by reference.

TECHNICAL FIELD

The present invention relates to a method for preparing a transition-metal composite oxide and a transition-metal composite metal, and a lithium composite oxide prepared using same, and more specifically, to: a method for preparing a lithium composite oxide, capable of preparing a lithium-ion secondary battery with high capacity, having high particle density and high tap density, by adjusting the pH of a reacting solution and the amount of a basic solution added during the preparation of a transition-metal composite oxide through a co-precipitation reaction; a transition-metal composite oxide prepared by the method; and a lithium composite oxide prepared thereby.

BACKGROUND

Lithium-ion secondary batteries have been produced in small capacity, light weight, and large capacity, and widely used as power sources of mobile phones since the advent of 1991.

In recent years, with rapid development of electronic, communication, and computer industries, there have been emerged camcorders, mobile phones, laptop PCs, and so on, now remarkably expanding over again. As power sources for driving those portable electronic information and communication machines, lithium-ion secondary batteries are increasingly demanded from data to day. A small lithium-ion secondary battery, which is currently come into the market, uses $LiCoO_2$ for anode and carbon for cathode.

As anode materials sprightly studied nowadays, there may be $LiNiO_2$, $LiCo_xNi_{1-x}O_2$, and $LiMn_2O_4$. $LiCoO_2$ is an excellent material having stable charging/discharging characteristics and plane discharge voltage characteristics, whereas there is a need of developing other anode materials because Co is insufficient in deposit, expensive and poisonous to a human body. $LiNiO_2$ is still not commercialized due to bad thermal stability as well as difficulty in synthesizing materials, while $LiMn_2O_4$ is partially commercialized for low price products. Otherwise, $LiMn_2O_4$ with a spinel structure has a logical capacity about 148 mAh/g which is smaller than that of other material, is smaller than LiCoO2 and LiNiO2, which are structured in second dimension, in diffusion coefficient as diffusion resistance becomes larger when lithium ions are inserted or separated because it has a three-dimensional tunnel structure, and is bad in cycle characteristics due to Jahn-Teller effect. Especially, the high temperature characteristics (in need of description) at 55° C. is inferior to that of $LiCoO_2$ and thus $LiMn_2O_4$ is not widely used for a practical battery.

To overcome those demerits, there are proposed methods of preparing lithium secondary battery active materials with high density and uniform particle sizes using co-precipitation, and studies for nickel-manganese-cobalt mixed lithium secondary batteries with low prices.

However, in the case of preparing a nickel-manganese-cobalt composite oxide through co-precipitation, if an amount of nickel increases, there are problems of degrading particle density among primary particles at the initial seed formation and decreasing tap density as a result.

DETAILED DESCRIPTION OF THE INVENTION

Technical Subject

The present invention is directed to solve the aforementioned problems, providing a method for preparing a lithium composite oxide capable of improving particle density and tap density with advanced conditions of co-precipitation reaction by adjusting concentration of an initial base added into a reactor in accordance with a content of nickel of particles prepared before the co-precipitation reaction, and a lithium composite oxide prepared by the method.

Solutions of the Subject

To solve the aforementioned problems, the present invention provides a method for preparing a transition-metal composite oxide, including:

a first step of preparing a first-interior forming aqueous metal-salt solution and a second-interior forming aqueous metal-salt solution that are different each other in concentration of nickel, cobalt, and manganese;

a second step of supplying a chelating agent and a basic solution into a reactor;

a third step of growing a particle including a first interior, which is uniform in concentration of nickel, cobalt, and manganese and has a radius of r1 (0.2 µm≤r1≤5 µm), while the first-interior forming aqueous metal-salt solution, the chelating agent, and the basic solution are continuously supplied into the reactor; and a fourth step of mixing a chelating agent and a basic solution in a reactor, at the same time of mixedly supplying the first-interior forming aqueous metal-salt solution and the second-interior forming aqueous metal-salt solution until a mixing ratio gradually goes to 0 v %:100 v % from 100 v %:0 v %, and forming a particle including a second interior, which has a radius of r2 (r2≤10 µm), on the contour of the first interior, wherein the second step adjusts concentration of the basic solution to 0.25 g/L through 0.5 g/L in the reactant.

In the present invention, it is characterized in optimizing a condition of co-precipitation reaction supplying an aqueous metal-salt solution by adjusting concentration of a basic solution of a reactor to be 0.25 g/L through 0.5 g/L before supplying an aqueous metal-salt solution into the reactor. The basic solution is continuously supplied in a process of preparing a transition-metal composite oxide.

In the method for preparing the lithium composite oxide, it is characterized of that the second step adjusts pH of a solution to be 11.8 through 12.3 in the reactor. In the method for preparing the lithium composite oxide, it is characterized of that nickel concentration of the first-interior forming aqueous metal-salt solution is adjusted in 0.8 through 1 mol %.

The inventors of the present invention founded a problem that, if pH of a reactor is equal to or higher than 12.3 before supplying an aqueous metal-salt solution in the case of supplying nickel for a high-capacity active material in the amount equal to or higher than 0.8 mol %, a seed grows faster than a particle, which is growing from the seed, when the aqueous metal-salt solution is supplied and thereby only the seed is much generated without generation of individual particles to cause incomplete growth of the individual particles due to the condensing of the excessively generated seeds. According as that, the present invention is characterized in adjusting the pH of the reactor to be equal to or lower than 12.3 before supplying the aqueous metal-salt solution.

In the method for preparing the lithium composite oxide according to the present invention, it is preferred to continuously supply the basic solution and ammonia through a reaction. After adjusting the initial pH of a reactor, the pH becomes lower in reaction while an acid aqueous metal-salt solution is being supplied to progress a particle forming reaction.

In the method for preparing the lithium composite oxide according to the present invention, it is characterized of that D50 becomes equal to or less than 4 μm in a size distribution of particles formed after the reaction for 30 minutes by the first step through the fourth step. That is, in the method for preparing the lithium composite oxide, it is characterized of that D50 becomes equal to or less than 4 μm in a size distribution of particles formed after the reaction for 30 minutes through the first step to the fourth step, by adjusting a generation speed of individual seeds and a generation speed of particles which grow from the individual seeds.

In the method for preparing the lithium composite oxide according to the present invention, it is characterized in further including a fifth step of drying or thermally treating a transition-metal composite oxide that is obtained from the first step through the fourth step, wherein an average particle diameter of the transition-metal composite oxide prepared by the fifth step is 5 to 10 μm.

The present invention additionally provides a transition-metal composite oxide prepared by the method according to the present invention.

The present invention additionally provides a method for preparing a lithium composite oxide, the method further including a fifth step of mixing the transition-metal composite oxide, which is formed in the fifth step, with a lithium salt and thermally treating the mixture, and provides a lithium composite oxide prepared by the method.

Average composition of a lithium composite oxide according to the present invention, throughout particles, is given in Formula 1.

$$Li_{aa}Ni_{xa}Co_{ya}Mn_{za}O_{2+\delta}$$ [Formula 1]

(in Formula 1, 0.5≤xa≤1.0).

That is, in average composition throughout particles of a lithium composite oxide prepared according to the present invention, a nickel content is equal to or higher than 0.5.

The present invention provides a method for preparing a transition-metal composite oxide, including: forming a first aqueous metal-salt solution with nickel, manganese, and cobalt;

forming a second aqueous metal-salt solution with nickel, manganese, and cobalt;

mixing a basic solution and an ammonia solution in a reactor to adjust pH of the mixture comprising the basic solution and the ammonia solution to 11.8 through 12.3, and supplying a first mixed aqueous metal-salt solution, which is formed of the first aqueous metal-salt solution and the second aqueous metal-salt solution, and ammonia and basic solutions into the reactor, wherein a mixing ratio of the first aqueous metal-salt solution and the second aqueous metal-salt solution in the first mixed aqueous metal-salt solution is equal to or higher than 0 v % and equal to or higher than 100 v %, and wherein the pH of the mixture is a first mixture pH or a second mixture pH which is higher than the first mixture pH, and an amount of nickel in the first aqueous metal-salt solution and the second aqueous metal-salt solution is a first nickel amount or a second nickel amount which is higher than the first nickel amount, and wherein the second mixture pH is selected when the second nickel amount is selected and the first mixture pH is selected when the first nickel amount is selected.

In the method for preparing the transition-metal composite oxide according to the present invention, a first aqueous metal-salt solution and a second aqueous metal-salt solution, which contain nickel, manganese, and cobalt, may be prepared through a process of mixing material solutions, which respectively contain nickel, manganese, and cobalt, in individual reactors.

The method for preparing the transition-metal composite oxide according to the present invention is characterized in satisfying at least one of x1≠x2, y1≠y2, and z1≠z2 under x1+y1+z1=1 and x2+y2+z2=1, wherein a nickel content is x1, a manganese content is y1, and a cobalt content is z1 in the first aqueous metal-salt solution, and wherein a nickel content is x2, a manganese content is y2, and a cobalt content is z3 in the second aqueous metal-salt solution. That is, it is allowable for a transition-metal composite oxide, which is manufactured by a method for preparing the transition-metal composite oxide according to the present invention, to be uniformly maintained in concentration of at least one of nickel, manganese, and cobalt throughout particles.

The method for preparing the transition-metal composite oxide according to the present invention is characterized of that the x1 is equal to or higher than 0.8 and equal to or lower than 1.0. The method for preparing the transition-metal composite oxide according to the present invention is characterized of that the x2 is equal to or lower than 0.8.

In the method for preparing the transition-metal composite oxide according to the present invention, nickel content may be adjusted in the first aqueous metal-salt solution to prepare a high-capacity transition-metal composite oxide with high nickel content.

The method for preparing the transition-metal composite oxide according to the present invention is characterized of gradually changing the mixing ratio of the first aqueous metal-salt solution and the second aqueous metal-salt solution toward 1 v %:100 v % from 100 v %:0 v %. That is, the method for preparing the transition-metal composite oxide according to the present invention is characterized of that at least a part of transition metals exhibits a concentration gradient in at least a part of particles.

A method for preparing the transition-metal composite oxide according to the present invention further is characterized of including: forming a third aqueous metal-salt solution with nickel, manganese, and cobalt; and supplying a second mixed aqueous metal-salt solution, which is formed of the first mixed aqueous metal-salt solution and the third aqueous metal-salt solution, and ammonia and basic solutions into a reactor, wherein a mixing ratio of the first mixed aqueous metal-salt solution and the third aqueous metal-salt solution in the second mixed aqueous metal-salt solution is higher than 0 v % and equal to or lower than 100 v %. The method for preparing the transition-metal composite oxide according to the present invention is characterized of including: gradually changing the mixing ratio of the first mixed aqueous metal-salt solution and the third aqueous metal-salt solution toward 1 v %:100 v % from 100 v %:0 v %.

That is, the method for preparing the transition-metal composite oxide according to the present invention is allowable to a transition-metal composite oxide which has two or more concentration gradients of nickel, manganese, and cobalt in particles by supplying the second mixed aqueous metal-salt solution.

The method for preparing the transition-metal composite oxide according to the present invention is characterized of satisfying at least one of x3≠x4, y3≠y4, and z3≠z4 under x3+y3+z3=1 and x4+y4+z4=1, wherein a nickel content is x3, a manganese content is y3, and a cobalt content is z3 in the first mixed aqueous metal-salt solution, and wherein a nickel content is x4, a manganese content is y4, and a cobalt content is z4 in the third aqueous metal-salt solution.

Advantageous Effects

A method for preparing a lithium composite oxide according to the present invention is allowable to provide a high-capacity lithium-ion secondary battery with high particle density and high tap density through pH control of a reactor by adjusting an amount of basic solution added according to an amount of nickel at the initial conditions of co-precipitation reaction.

BRIEF DESCRIPTION OF THE DRAWINGS

FIGS. 1 and 2 show particle size distributions of precursors after 30 minutes and after completion, respectively, from the beginning of co-precipitation reaction according to an embodiment of the present invention.

FIGS. 3 and 4 show SEM photographs taken from sections of a precursor and an active material which are prepared according to an embodiment of the present invention.

FIGS. 5 and 6 show particle size distributions of precursors after 30 minutes and after completion, respectively, from the beginning of co-precipitation reaction according to an embodiment of the present invention.

FIGS. 7 and 8 show SEM photographs taken from sections of a precursor and an active material which are prepared according to an embodiment of the present invention.

FIGS. 9 and 10 show particle size distributions of precursors after 30 minutes and after completion, respectively, from the beginning of co-precipitation reaction according to an embodiment of the present invention.

FIGS. 11 and 12 show SEM photographs taken from sections of a precursor and an active material which are prepared according to an embodiment of the present invention.

FIGS. 13 and 14 show particle size distributions of precursors after 30 minutes and after completion, respectively, from the beginning of co-precipitation reaction according to an embodiment of the present invention.

FIGS. 15 and 16 show SEM photographs taken from sections of a precursor and an active material which are prepared according to an embodiment of the present invention.

FIGS. 17 and 18 show particle size distributions of precursors after 30 minutes and after completion, respectively, from the beginning of co-precipitation reaction according to an embodiment of the present invention.

FIGS. 19 and 20 show SEM photographs taken from sections of a precursor and an active material which are prepared according to an embodiment of the present invention.

FIGS. 21 and 22 show particle size distributions of precursors after 30 minutes and after completion, respectively, from the beginning of co-precipitation reaction according to an embodiment of the present invention.

FIGS. 23 and 24 show SEM photographs taken from sections of a precursor and an active material which are prepared according to an embodiment of the present invention.

FIGS. 25 and 26 show particle size distributions of precursors after 30 minutes and after completion, respectively, from the beginning of co-precipitation reaction according to an embodiment of the present invention.

FIGS. 27 and 28 show SEM photographs taken from sections of a precursor and an active material which are prepared according to an embodiment of the present invention.

MODES FOR EMBODIMENTS OF THE INVENTION

Hereinafter, various embodiments of the present invention will be described in conjunction with the accompanying drawings. The present invention, however, may not be intentionally confined in embodiments described below.

<Embodiment 1>

After injecting an initial NaOH in the rate of 9 g per 2.5 L distilled water to adjust the pH of the reactive solution to 11.9, a center forming solution with Ni:Co:Mn composition ratio of 85:5:10 was supplied to form particles with a radius of 0.2 μm through a co-precipitation reaction. A surface forming solution was formed in Ni:Co:Mn composition ratio of 60:15:25 and, at the same time of mixing an aqueous metal salt solution for the center and an aqueous metal salt solution for the surface until the mixing ratio gradually went to 0 v %:100 v % from 100 v %:0 v %, a chelating agent and a basic solution were mixedly supplied into a reactor. Then, transition-metal composite oxide particles were prepared.

From the beginning of the co-precipitation reaction, particle size distributions after 30 minutes and after the completion of reaction were respectively measured and shown in FIGS. 1 and 2. In the particle size distributions after 30 minutes and after the completion of reaction from the beginning of the co-precipitation reaction in FIGS. 1 and 2, it could be seen that D50 was adjusted equal to or less than 4 μm.

After reacting the prepared precursors with a lithium compound, active material particles were prepared through a firing with the reactant. Then, SEM photographs are taken from the prepared precursor particle and the active material particle and are shown in FIGS. 3 and 4. It can be seen from FIGS. 3 and 4 that the interior of the particle is formed densely.

<Embodiment 2>

After forming a center forming solution with Ni:Co:Mn composition ratio of 95:2:3 and injecting an initial NaOH in the rate of 10 g per 2.5 L distilled water to adjust the pH of the reactive solution to 11.9, particles of a transition-metal composite oxide with a radius of 0.2 μm were prepared through a co-precipitation reaction.

A2-1'th-interior forming solution was formed in Ni:Co:Mn composition of 85:6:9 and a 2-2'th-interior forming solution was formed in Ni:Co:Mn composition ratio of 65:10:25. And, at the same time of mixing an aqueous metal salt solution for the center and the 2-1'th-interior forming solution until the mixing ratio gradually went to 0 v %:100 v % from 100 v %:0 v % and forming a first mixed aqueous metal solution, a chelating agent and a basic solution were mixedly supplied into a reactor to first form a 2-1'th interior on the surface of a first interior. Next, at the at the same time of mixing the first mixed aqueous metal solution and the 2-2'th-interior forming solution until the mixing ratio gradually went to 0 v %:100 v % from 100 v %:0 v % and forming a second mixed aqueous metal solution to be supplied into a reactor, a chelating agent and a basic solution were mixedly supplied to form a 2-2'th interior, which is different from the 2-1'th interior in concentration gradient of at least one of nickel, manganese, and cobalt, on the surface of the 2-1'th interior.

From the beginning of the co-precipitation reaction, particle size distributions after 30 minutes and after the completion of reaction were respectively measured and shown in FIGS. 5 and 6.

From the beginning of the co-precipitation reaction, particle size distributions after 30 minutes and after the completion of reaction were respectively measured and shown in FIGS. 1 and 2. In the particle size distributions after 30 minutes and after the completion of reaction from the beginning of the co-precipitation reaction in FIGS. 1 and 2, it could be seen that D50 was adjusted equal to or less than 4 μm.

After reacting the prepared precursors with a lithium compound, active material particles were prepared through a firing with the reactant. Then, SEM photographs are taken from the prepared precursor particle and the active material particle and are shown in FIGS. 7 and 8. It can be seen from FIGS. 7 and 8 that the interior of the particle is formed densely.

<Comparison 1>

After forming a first-interior forming solution with Ni:Co:Mn composition ratio of 95:2:3 and injecting an initial NaOH in the rate of 7 g per 2.5 L distilled water to adjust the pH of the reactive solution to 11.7, particles of a transition-metal composite oxide were prepared through a co-precipitation reaction.

From the beginning of the co-precipitation reaction, particle size distributions after 30 minutes and after the completion of reaction were respectively measured and shown in FIGS. 9 and 10.

In the particle size distributions after 30 minutes and after the completion of reaction from the beginning of the co-precipitation reaction in FIGS. 1 and 2, it could be seen that D50 was adjusted equal to or larger than 4 μm.

After reacting the prepared transition-metal composite oxide particles with a lithium compound, active material particles were prepared through a firing with the reactant. Then, SEM photographs are taken from the prepared precursor particle and the active material particle and are shown in FIGS. 11 and 12. It can be seen from FIGS. 11 and 12 that the interior of the particle is formed densely and particles of 10 μm are most present in the particle size distributions.

<Embodiment 3>

After forming a first-interior forming solution with Ni:Co:Mn composition ratio of 95:2:3 and injecting an initial NaOH in the rate of 7 g per 2.5 L distilled water to adjust the pH of the reactive solution to 11.7, precursor particles with a radius of 0.2 μm was prepared through a co-precipitation reaction.

A second-interior forming solution was formed in Ni:Co:Mn composition ratio of 95:2:3. In forming a first mixed aqueous metal solution as a mixed solution of the center forming aqueous metal-salt solution and the second-interior forming solution, at the same time of mixing an center forming aqueous metal-salt solution and the second-interior forming solution until the mixing ratio gradually went to 0 v %:100 v % from 100 v %:0 v %, a chelating agent and a basic solution were mixedly supplied into a reactor to prepare transition-metal composite oxide particles throughout which nickel, manganese, and cobalt exhibited concentration gradients.

From the beginning of the co-precipitation reaction, particle size distributions after 30 minutes and after the completion of reaction were respectively measured and shown in FIGS. 13 and 14.

In the particle size distributions after 30 minutes and after the completion of reaction from the beginning of the co-precipitation reaction in FIGS. 13 and 14, it can be seen that D50 was adjusted equal to or less than 4 μm.

After reacting the prepared transition-metal composite particles with a lithium compound, active material particles were prepared through a firing with the reactant. Then, SEM photographs were taken from the prepared precursor particle and the active material particle and are shown in FIGS. 15 and 16. It can be seen from FIGS. 15 and 16 that the interior of the particle is formed densely.

<Comparison 2>

After injecting an initial NaOH in the rate of 7 g per 2.5 L distilled water to adjust the pH of the reactive solution to 11.7, a first-interior forming solution were manufactured in Ni:Co:Mn composition ratio of 96:2:2 and then supplied into the reactor to form precursor particles through a co-precipitation reaction.

From the beginning of the co-precipitation reaction, particle size distributions after 30 minutes and after the completion of reaction were respectively measured and shown in FIGS. 17 and 18.

After reacting the prepared precursor with a lithium compound, active material particles were prepared through a firing with the reactant. Then, SEM photographs are taken from the prepared precursor particle and the active material particle and are shown in FIGS. 19 and 20.

<Embodiment 4>

After forming a center forming solution with Ni:Co:Mn composition ratio of 98:1:1 and injecting an initial NaOH in the rate of 12 g per 2.5 L distilled water to adjust the pH of the reactive solution to 12, precursor particles with a radius of 0.2 μm were prepared through a co-precipitation reaction.

A 2-1'th-interior forming solution was formed in Ni:Co:Mn composition of 91:3:6 and a 2-2'th-interior forming solution was formed in Ni:Co:Mn composition ratio of 80:7:13. And, at the same time of mixing the center forming aqueous metal-salt solution and the 2-1'th-interior forming solution until the mixing ratio gradually went to 0 v %:100 v % from 100 v %:0 v % and forming a first mixed aqueous metal solution, a chelating agent and a basic solution were mixedly supplied into a reactor to first form a 2-1'th interior on the surface of a first interior. Next, at the at the same time of mixing the 2-1'th-interior forming solution and the 2-2'th-interior forming solution until the mixing ratio gradually went to 0 v %:100 v % from 100 v %:0 v % and forming a second mixed aqueous metal solution, a chelating agent and a basic solution were mixedly supplied into a reactor to form a 2-2'th interior on the surface of the 2-1'th interior.

After then, a third-interior forming solution was formed in Ni:Co:Mn composition ratio of 57:16:27 and a co-precipitation reaction was performed to prepare precursor particles including a third interior with uniform concentration of nickel, manganese, and cobalt out of the 2-2'th interior.

From the beginning of the co-precipitation reaction, particle size distributions of the transition-metal composite oxide after 30 minutes and after the completion of reaction were respectively measured and shown in FIGS. 21 and 22.

After reacting the prepared transition-metal composite oxide with a lithium compound, active material particles were prepared through a firing with the reactant.

Then, SEM photographs are taken from the prepared precursor particle and the active material particle and are shown in FIGS. 23 and 24.

<Comparison 3>

Except manufacturing a first-interior forming solution in Ni:Co:Mn composition ratio of 98:1:1 and injecting an initial NaOH in the rate of 9 g per 2.5 L distilled water to adjust pH to 11.8, particles were prepared in the same manner with Embodiment 3. From the beginning of the co-precipitation reaction, particle size distributions after 30 minutes and after the completion of reaction were respectively measured and shown in FIGS. 25 and 26.

After reacting the prepared precursor with a lithium compound, active material particles were prepared through a firing with the reactant. Then, SEM photographs are taken from the prepared precursor particle and the active material particle and are shown in FIGS. 27 and 28.

<Experimental Example>Measuring Tap Density

Tap densities for precursors and active materials, which were prepared by Embodiments 1 to 4 and Comparisons 1 to 3, were measured and summarized in Table 1.

From Table 1, it can be seen the precursors and active materials, which are prepared according to the present invention, are greatly improved, as much as 15% or more, than Comparisons in tap density.

TABLE 1

|  |  | Tap density (g/cc) |
|---|---|---|
| Embodiment 1 | Precursor | 2.23 |
|  | Sinter | 2.62 |
| Embodiment 2 | Precursor | 2.21 |
|  | Sinter | 2.59 |
| Comparison 1 | Precursor | 2.08 |
|  | Sinter | 2.41 |
| Embodiment 3 | Precursor | 2.19 |
|  | Sinter | 2.60 |
| Comparison 2 | Precursor | 2.05 |
|  | Sinter | 2.39 |
| Embodiment 4 | Precursor | 2.20 |
|  | Sinter | 2.58 |
| Comparison 3 | Precursor | 2.02 |
|  | Sinter | 2.41 |

<Experimental Example>Measuring Lifetime Characteristics

Using the active materials prepared by Embodiments 1 to 4 and Comparisons 1 to 3, coin cells were manufactured and lifetime characteristics respective to the coin cells were measured and summarized in Table 2.

TABLE 2

|  | Lifetime characteristics % ($100^{th}$) |
|---|---|
| Embodiment 1 | 96.2 |
| Embodiment 2 | 95.4 |
| Comparison 1 | 89.3 |
| Embodiment 3 | 94.8 |
| Comparison 2 | 87.6 |
| Embodiment 4 | 93.2 |
| Comparison 3 | 78.9 |

INDUSTRIAL USABILITY

A method for preparing a lithium composite oxide according to the present invention is capable of preparing a high-capacity lithium-ion secondary battery with high particle density and high tap density through pH control of a reactor by adjusting an amount of basic solution added according to an amount of nickel at the initial conditions of co-precipitation reaction.

The invention claimed is:

1. A method for preparing a transition-metal composite oxide,
the method comprising:
forming a first aqueous metal-salt solution with nickel, manganese, and cobalt;
forming a second aqueous metal-salt solution with nickel, manganese, and cobalt;
mixing a basic solution and an ammonia solution in a reactor to adjust pH of the mixture comprising the basic solution and the ammonia solution to 11.8 through 12.3; and
supplying a first mixed aqueous metal-salt solution, which is formed of the first aqueous metal-salt solution and the second aqueous metal-salt solution, and the mixture into the reactor,
wherein the pH of the mixture is a first mixture pH or a second mixture pH which is higher than the first mixture pH, and an amount of nickel in the first aqueous metal-salt solution and the second aqueous metal-salt solution is a first nickel amount or a second nickel amount which is higher than the first nickel amount, and
wherein the second mixture pH is selected when the second nickel amount is selected and the first mixture pH is selected when the first nickel amount is selected.

2. The method of claim 1,
wherein said first aqueous metal-salt solution satisfies the molar equation $x1+y1+z1=1$ in which nickel content is $x1$, manganese content is $y1$, and cobalt content is $z1$,
wherein said second aqueous metal-salt solution satisfies the molar equation $x2+y2+z2=1$ in which nickel content is $x2$, manganese content is $y2$, and cobalt content is $z2$, and
wherein at least one of $x1 \neq x2$, $y1 \neq y2$, and $z1 \neq z2$.

3. The method of claim 2, wherein the $x1$ is equal to or higher than 0.8 and equal to or lower than 1.0.

4. The method of claim 2, wherein the $x2$ is equal to or lower than 0.8.

5. The method of claim 1, wherein the supplying of the first mixed aqueous metal-salt solution comprises:
gradually changing the mixing ratio of the first aqueous metal-salt solution and the second aqueous metal-salt solution toward 1 v %: 100 v % from 100 v %: 0 v %.

6. The method of claim 1, further comprising:
forming a third aqueous metal-salt solution with nickel, manganese, and cobalt; and
supplying a second mixed aqueous metal-salt solution, which is formed of the first mixed aqueous metal-salt solution and the third aqueous metal-salt solution, and the mixture into the reactor.

7. The method of claim 6,
wherein said third aqueous metal-salt solution satisfies the molar equation $x4+y4+z4=1$ in which nickel content is $x4$, manganese content is $y4$, and cobalt content is $z4$ in the third aqueous metal-salt solution, wherein said first mixed aqueous metal-salt solution satisfies the molar equation $x3+y3+z3=1$ in which nickel content is $x3$, manganese content is $y3$, and cobalt content is $z3$, and wherein at least one of $x3 \neq x4$, $y3 \neq y4$, and $z3 \neq z4$.

8. The method of claim 6, wherein the supplying of the second mixed aqueous metal-salt solution comprises:

gradually changing the mixing ratio of the first mixed aqueous metal-salt solution and the third aqueous metal-salt solution toward 1 v %: 100 v % from 100 v %: 0 v %.

* * * * *